(12) United States Patent
Jones

(10) Patent No.: US 7,916,814 B2
(45) Date of Patent: Mar. 29, 2011

(54) METHOD AND APPARATUS FOR REAL-TIME PULSE PARAMETER ESTIMATOR

(75) Inventor: Ben Jones, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 717 days.

(21) Appl. No.: 11/929,659

(22) Filed: Oct. 30, 2007

(65) Prior Publication Data

US 2008/0298514 A1  Dec. 4, 2008

Related U.S. Application Data

(60) Provisional application No. 60/932,375, filed on May 30, 2007.

(51) Int. Cl.
H04L 27/06 (2006.01)
(52) U.S. Cl. ..................................................... 375/340
(58) Field of Classification Search .................. 375/224, 375/340, 342, 377; 324/76.11
See application file for complete search history.

(56) References Cited

U.S. PATENT DOCUMENTS

| | | | |
|---|---|---|---|
| 4,209,835 A | 6/1980 | Guadagnolo | |
| 4,516,220 A | 5/1985 | Bauman | |
| 4,721,958 A | 1/1988 | Jenkin | |
| 5,396,250 A * | 3/1995 | Tsui et al. | 342/13 |
| 5,565,764 A * | 10/1996 | Priebe et al. | 324/76.21 |
| 6,714,605 B2 | 3/2004 | Sugar et al. | 375/340 |
| 7,133,887 B2 | 11/2006 | Sirois | |
| 7,224,752 B2 * | 5/2007 | Sugar et al. | 375/340 |
| 7,254,191 B2 * | 8/2007 | Sugar et al. | 375/340 |
| 7,292,656 B2 * | 11/2007 | Kloper et al. | 375/340 |

OTHER PUBLICATIONS

The International Bureau of WIPO, International Application No. PCT/US2008/064856, The International Search Report and The Written Opinion of the International Searching Authority, mailed Mar. 3, 2009 (15 pgs.).
Sirianunpiboon, S., et al., "Robust and Recursive Radar Pulse Train Parameter Estimators", Proceedings of ISSPA, 1996, 4 pages.
Gray, Douglas A., et al., "Parameter Estimation for Periodic Discrete Event Processes", IEEE, Proceedings of ICASSP, 1994, 4 pages.
Howard, Stephen D., et al., "A Robust Recursive Filter for Radar Pulse Train Parameter Estimation and Tracking", IEEE TAES, 1996, 9 pages.
Douglas A. Gray, et al., "Parameter Estimation For Periodic Discrete Event Processes," Proceedings of ICASSP, 1994, 4 pages.
Current Claims for PCT patent application No. PCT/US2008/064856, dated Dec. 11, 2008, (7 pgs.).

* cited by examiner

*Primary Examiner* — Jean B Corrielus
(74) *Attorney, Agent, or Firm* — Hickman Palermo Truong & Becker LLP

(57) ABSTRACT

A real-time pulse parameter estimator is disclosed herein. In one embodiment, an apparatus has pulse detection logic, an abnormal pulse filter, and a pulse parameter estimator. The pulse detection logic is operable to detect pulses and to record an arrival time of each detected pulse. The abnormal pulse filter is operable to analyze the arrival time of the detected pulses and to determine whether there are any abnormal pulses based on the analysis. In one embodiment, the abnormal pulse filter generates an adjusted time difference of arrival (TDOA) signal for a pulse, based on a determination that the pulse is abnormal. The pulse parameter estimator is operable to estimate a pulse parameter for the signal based on an analysis of the arrival times of the detected pulses and information pertaining to there being any abnormal pulses in the signal.

31 Claims, 13 Drawing Sheets

METHOD AND APPARATUS FOR REAL-TIME PULSE PARAMETER ESTIMATOR

CROSS-REFERENCE TO RELATED APPLICATIONS; PRIORITY CLAIM

This application claims benefit of Provisional Appln. 60/932,375, filed May 30, 2007, the entire contents of which is hereby incorporated by reference as if fully set forth herein, under 35 U.S.C. §119(e).

FIELD OF THE INVENTION

The present invention relates to real-time signal processing. In particular, embodiments of the present invention relate to estimating pulse parameters.

BACKGROUND

Wireless communications devices need to detect and classify electromagnetic waveforms in the vicinity of the device. As one example of this need, a particular wireless device may need to determine if other devices are outputting electromagnetic radiation that could interfere with transmissions of the particular wireless device. The interferer could be another communication device such as a cordless phone, or 802.11 device. However, the interferer might not be a communication device. For example, a microwave oven could cause interference.

As another example of this need to detect and classify electromagnetic waveforms, a wireless device may need to detect radar signals to comply with government regulations. Throughout the world, various communication regulatory bodies allow wireless communications devices, such as 802.11 devices, to operate in certain frequency bands subordinate to other transmitters. For example, in the United States an "unlicensed" wireless device is allowed to operate in the 5.250-5.350 and 5.470-5.725 GHz bands, provided that the unlicensed device employs dynamic frequency selection (DFS) to vacate the band if a radar signal is present in the band. Prior to and during transmission in these bands, the unlicensed wireless device must monitor for radar waveforms and either vacate the band or flag the band as unavailable for present use by the unlicensed wireless device.

In order to detect and classify electromagnetic waveforms such as interfering signals and radars, the wireless device can first extract features of the electromagnetic waveforms. These features could be time-domain features, such as those that pertain to signal pulses. One example of a time-domain feature is a given pulse's time difference of arrival (TDOA), which is the difference in arrival time between the given pulse and the previous pulse. A parameter that is related to the TDOA is the pulse repetition interval (PRI), which is defined as the time between successive pulses. The PRI is typically calculated based on the TDOA of a train of pulses. The PRI may be constant over time or time-varying. For example, the PRI of a microwave oven may become shorter over time. Another time-domain feature is the pulse width. In addition to these time domain features, frequency domain features such as carrier frequency could also be extracted from the electromagnetic waveform. Based on the extracted features, the electromagnetic waveform can be classified or identified by comparing the features with expected characteristics.

However, if there are errors in feature extraction, then the electromagnetic waveform could be mis-classified. For example, fluctuations in the magnitude of the electromagnetic waveform, as received, may cause pulses to be missed. Also, background noise could lead to "detection" of a false pulse. Both of these errors could lead to a substantial error in calculation of the PRI. Furthermore, timing jitter due to noise can lead to a substantial difference between the TDOA at the receiving device and the time difference between pulses at the transmitting device.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
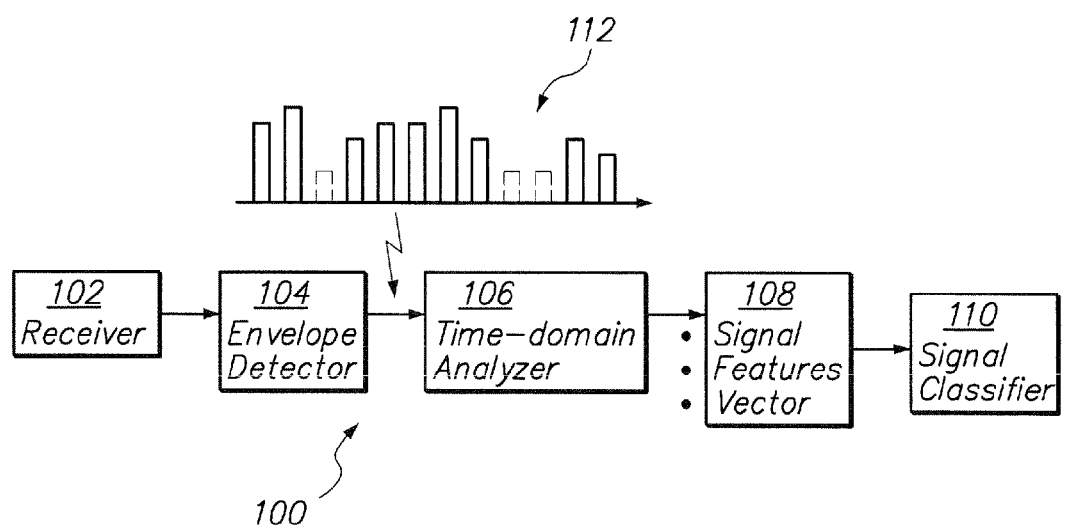
FIG. 1 shows a system to detect and classify signals based on one or more time-domain features, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A real-time pulse parameter estimator is disclosed herein. The estimator could be part of logic that is used to detect and classify signals received by a wireless communications device, such as an 802.11 device, but that is not required. As an example, the wireless communications device may need to detect the presence of a signal that could interfere with transmission. As examples, those interfering signals might be from a microwave oven, or another communications devices (e.g., an 802.11 device). As another example, the wireless communications device may need to determine if certain radars are present and, if so, vacate the band of on which the radar is being transmitted.

Pulse repetition interval (PRI) is estimated using a technique that compensates for abnormal pulses in a regular burst of pulses, in an embodiment. The abnormal pulse could be a missing pulse, a pulse that arrives early or late, or some other abnormality. The PRI is estimated using an adaptive gear-shifting algorithm, in an embodiment, which results in quick convergence of the PRI to a substantially stable value.

In one embodiment, an apparatus (such as a wireless communications device) has pulse detection logic, an abnormal pulse filter, and a pulse parameter estimator. The pulse detection logic is operable to detect pulses and to record an arrival time of each detected pulse. The abnormal pulse filter is operable to analyze the arrival time of the detected pulses and to determine whether there are any abnormal pulses based on the analysis. In one embodiment, the abnormal pulse filter generates an adjusted time difference of arrival (TDOA) signal for a pulse, based on a determination that the pulse is abnormal. The pulse parameter estimator is operable to estimate a pulse parameter for the signal based on an analysis of the arrival times of the detected pulses and information pertaining to there being any abnormal pulses in the signal.

In one embodiment, the pulse parameter estimator has gear shifting logic and pulse parameter estimation logic. The gear shifting logic is operable to select a time interval from a plurality of time intervals, based at least in part on a magnitude of an error signal. The error signal is derived from a previously generated value for a particular pulse parameter (e.g., PRI) and current pulse information (e.g., TDOA). The pulse parameter estimation logic is operable to determine a new value for the particular pulse parameter by analyzing pulse information derived from pulses that were detected within the time interval.

In one embodiment, the abnormal pulse filter has storage that holds a set of window parameters, wherein each window parameter has a value that is based on a pulse characteristic. The abnormal pulse filter has logic to generate a set of time windows based on the set of window parameters and a pulse repetition interval (PRI). Further, the abnormal pulse filter has abnormal pulse logic that is operable to determine whether an abnormal pulse is present based on the set of time windows and a time difference of arrival (TDOA) of the current pulse relative to the last detected pulse. Responsive to a determination that there is an abnormal pulse, the abnormal pulse logic is able to identify an abnormal pulse characteristic for the abnormal pulse and to store a value that defines the abnormal pulse characteristic.

Example System

The example system 100 of FIG. 1 is able to detect and classify signals that are received by the receiver 102. The system 100 could be part of a wireless communications device, an example of which is an 802.11 device, although the system 100 is not so limited. The receiver 102 processes a radio frequency signal and passes it to the envelope detector 104, which computes the signal envelope 112. The time-domain analyzer 106 processes the signal envelope 112 in real-time and extracts time-domain properties such as pulse time-of-arrival (TOA), time-difference-of-arrival (TDOA) between pulses successive, pulse length, PRI, etc. The time-domain analyzer 106 aggregates these extracted properties to form and store a signal feature vector 108. The feature vector 108 is further processed by a signal classifier 110, which determines the type and/or source of the signal. As an example, the signal classifier 110 might determine that the signal has characteristics that indicates it is a radar signal. Based on this information, the wireless device either vacates the radar band or determines that the radar band should not be used.

FIG. 1 shows an example signal envelope 112 with several pulses missing (shown as dotted lines). By missing it is meant that the device did not detect a particular pulse even though the signal had a pulse there when transmitted by the source. The time domain analyzer 106 is able to determine if the signal envelope 112 has pulses with abnormal characteristics. Examples of abnormal characteristics include, but are not limited to, missing pulses, pulses that arrive earlier or later than expected, and pulse widths that are longer or shorter than expected. Note that since the time domain analyzer 106 performs its analysis prior to the signal classifier 110, the time domain analyzer 106 determines these abnormal characteristics without knowing what the signal is, in this embodiment. The time domain analyzer 106 makes this abnormal characteristic determination based on whether current time domain data (e.g., pulse TDOA, pulse width, PRI, etc.) comply with characteristics that are expected based on analysis of prior time domain data, in an embodiment. For example, the time domain analyzer 106 might determine that the TDOA of the current pulse is abnormal, based on a previously determined PRI.

The various blocks in system 100 can be implemented in hardware, software, or some combination of hardware and software. For example, a wireless communications device might have an application specific integrated circuit (ASIC) that is designed to detect and classify various signals by implementing the envelope detector 104, the time domain analyzer 106, and the signal classifier 110. The wireless communications device could have other ASICs to implement such functions as wireless LAN access. The receiver 102 could be a different receiver than is used by the rest of the wireless communications device. At least some of the blocks might be implemented, at least in part, using software. For example, instructions could be stored on a computer readable medium and executed on a processor in order to implement some of the blocks, or portions of a given block. In particular, in one embodiment, at least some portions of the time domain analyzer 106 are implemented in software.

Example Time Domain Analyzer

Figure 2:
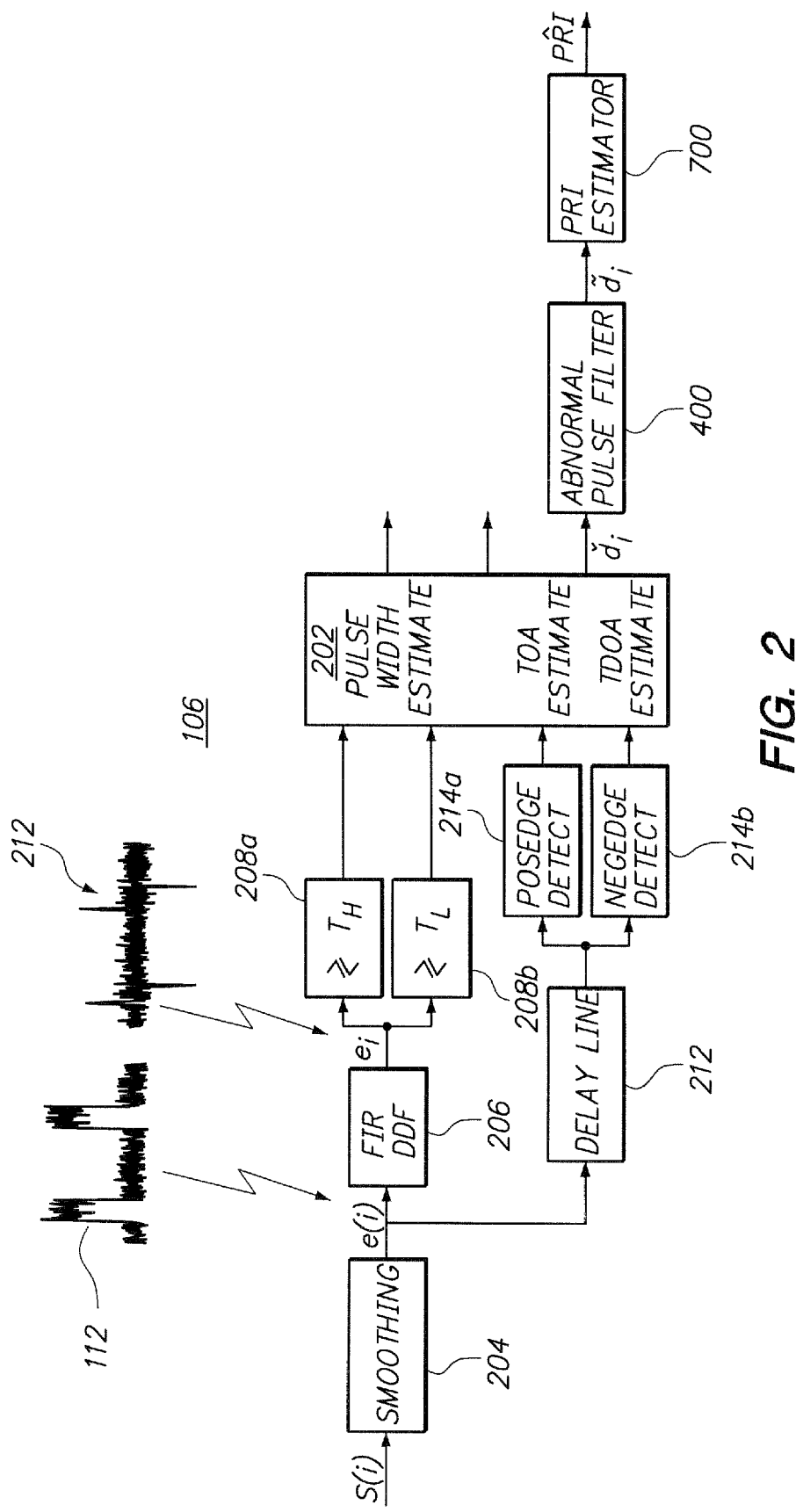
FIG. 2 shows a time domain analyzer, in accordance with an embodiment of the present invention.

One embodiment of the time-domain analyzer 106 is depicted in FIG. 2. In general, the pulse data estimation logic 202 estimates various parameters such as pulse width, time of arrival (TOA), and time difference of arrival (TDOA), based information derived from the signal envelope 112.

Figure 3:
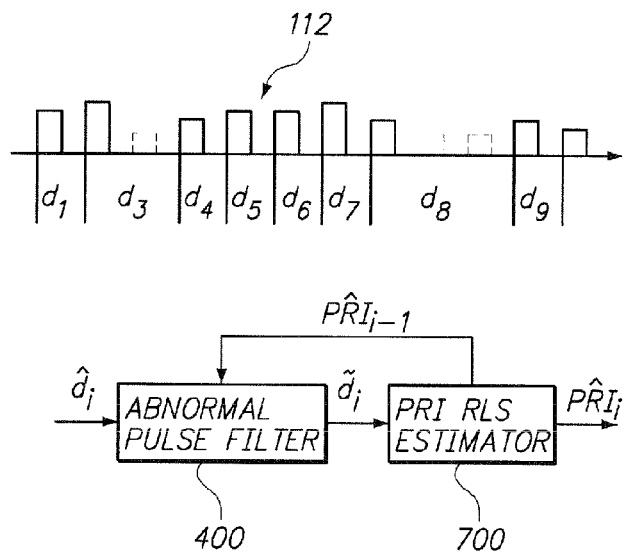
FIG. 3 depicts a block diagram of an abnormal pulse filter and a real time parameter estimator, in accordance with an embodiment.

Referring briefly to FIG. 3, the abnormal pulse filter 400 detects and classifies abnormal pulses, based at least upon a "raw" TDOA ($\hat{d}$) from the pulse data estimation logic (not depicted in FIG. 3). The raw TDOA, $\hat{d}$, is the TDOA for a given pulse prior to an adjustment for abnormal characteristics. The abnormal pulse filter 400 analyzes the current pulse and determines whether its characteristics indicate that it is an abnormal pulse. Based on this analysis, the abnormal pulse filter 400 outputs an adjusted TDOA (ď). As an example, the abnormal pulse filter 400 could adjust the TDOA to compensate for missing pulses; however, the adjustment could be based on other abnormal characteristics. The PRI estimator 700 determines the PRI ($PRI_i$) based on the adjusted TDOA, ď. The PRI is fed back into the abnormal pulse filter (as $PRI_{i-1}$), which the abnormal pulse filter 400 uses to detect and classify abnormal pulses. Details of the abnormal pulse filter 400 and the PRI estimator 700 are discussed below.

Referring again to FIG. 2, the logic up front that detects pulse edges will now be discussed. The input, s(i), to the smoothing 204 is the signal envelope 112, which is passed from the signal envelope detector (not depicted in FIG. 2). The smoothing 204 removes short term variations from s(i), such as those due to noise, and outputs a smoothed envelope signal, e(i). The finite impulse-response (FIR) digital differentiation filter (DDF) computes and outputs the derivative, ė(t) of the envelope signal. The derivative signal, ė(t) 212, is input to positive and negative threshold detectors 208a, 208b, which detect rising and falling pulse edges, based on a high threshold $T_H$, and a low threshold $T_L$, respectively.

The various time domain parameters could be determined from the output of the threshold detectors 208a, 208b alone. However, for additional accuracy, the smoothed envelope signal e(i) is input to delay line 212, and then input into a positive edge detect 214a and a negative edge detect 214b. The delay line 212 on the envelope signal accounts for the processing latency and group delay in the FIR DDF 206, thereby time-aligning the datapaths.

The pulse data estimation logic 202 can estimate the various time domain parameters based on the signals from the threshold detectors 208a, 208b and/or the signals from the edge detectors 214a, 214b. The pulse data estimation logic 202 may use threshold crossing mechanisms and equations known in the art to estimate the pulse timing parameters.

Example Window Parameters

Figure 5:
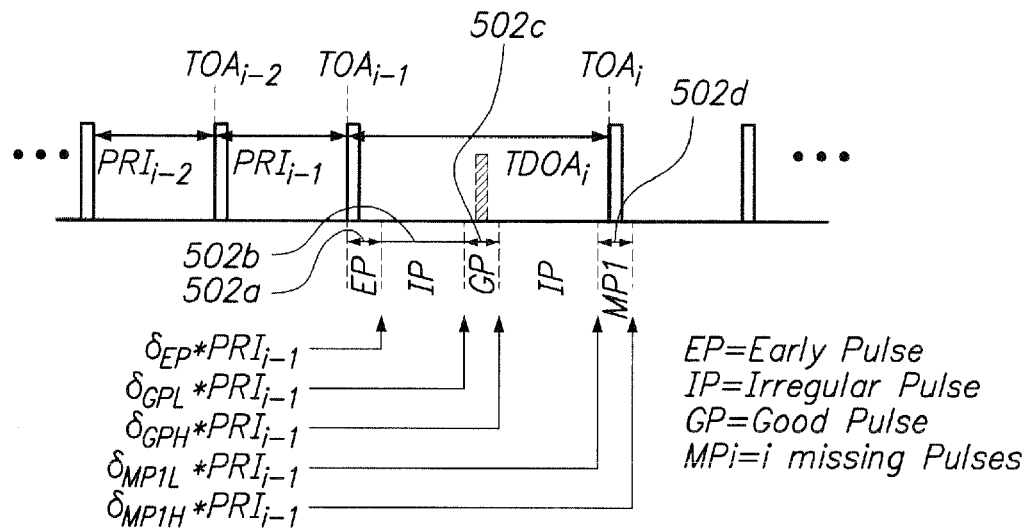
FIG. 5 and FIG. 6 show example pulse trains with TDOA windows, as defined by window parameters, in accordance with an embodiment.
Figure 6:
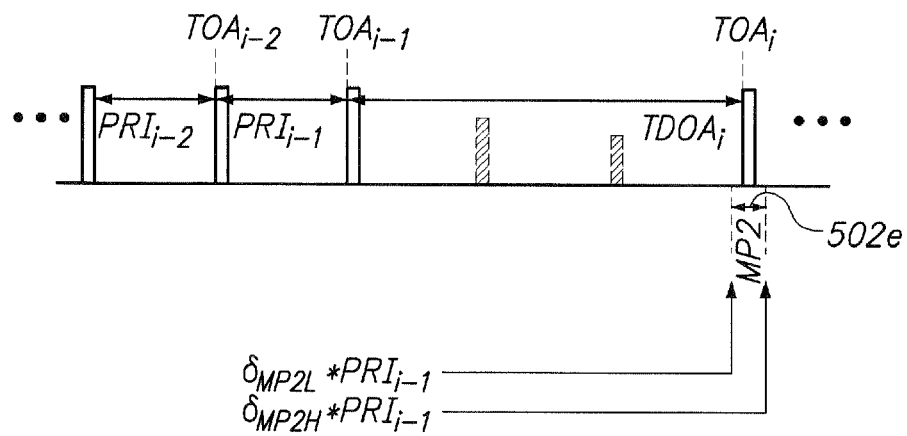

Prior to discussing the abnormal pulse analyzer 400, some example window parameters, which are used by the abnormal pulse analyzer 400, will be discussed. The window parameters, which are stored in a set of registers, are multiplied by the last $PRI_{i-1}$ to determine "TDOA windows." Referring to FIG. 5 and FIG. 6, a pulse is classified in accordance with the TDOA window 502a-e into which it falls. For example, a pulse that falls into the TDOA window 502c defined by "GP" is defined as a "good pulse." Table I lists example window parameters and whether the parameter is used to determine the beginning or end of a TDOA window.

TABLE I

| Window parameter | multiplied by $PRI_{i-1}$ defines |
| --- | --- |
| $\delta_{EP}$ | end of the early pulse window |
| $\delta_{GPL}$ | start of good pulse window |
| $\delta_{GPH}$ | end of good pulse window |
| $\delta_{MP1L}$ | start of window for one missed pulse |
| $\delta_{MP1H}$ | end of window for one missed pulse |
| $\delta_{MP2L}$ | start of window for two missed pulses |
| $\delta_{MP2H}$ | end of window for two missed pulses |

As one example, the window parameter $\delta_{EP}$ is multiplied by the last $PRI_{i-1}$ to define the end of the early pulse (EP) window 502a. Any pulse that falls within this window 502a is classified as an early pulse. As another example, $\delta_{MP1L}$ is multiplied by the last $PRI_{i-1}$ to define the beginning of the window 502d for missed one pulse (MP1) and $\delta_{MP2L}$ is multiplied by the last $PRI_{i-1}$ to define the end of the window 502d for missed one pulse (MP1). If a pulse falls within this window 502d an assumption is made that one pulse was missed. Table 1 also has window parameters to define a good pulse window (GP), and missing two pulses (MP2). There can be other window parameters, such as those for missing three, four, or more pulses. Note that FIG. 5 also has a TDOA window 502b for an irregular pulse (IP), which is defined by a pulse that falls in between an early pulse and a good pulse, in this example.

Example Abnormal Pulse Analyzer

Figure 4:
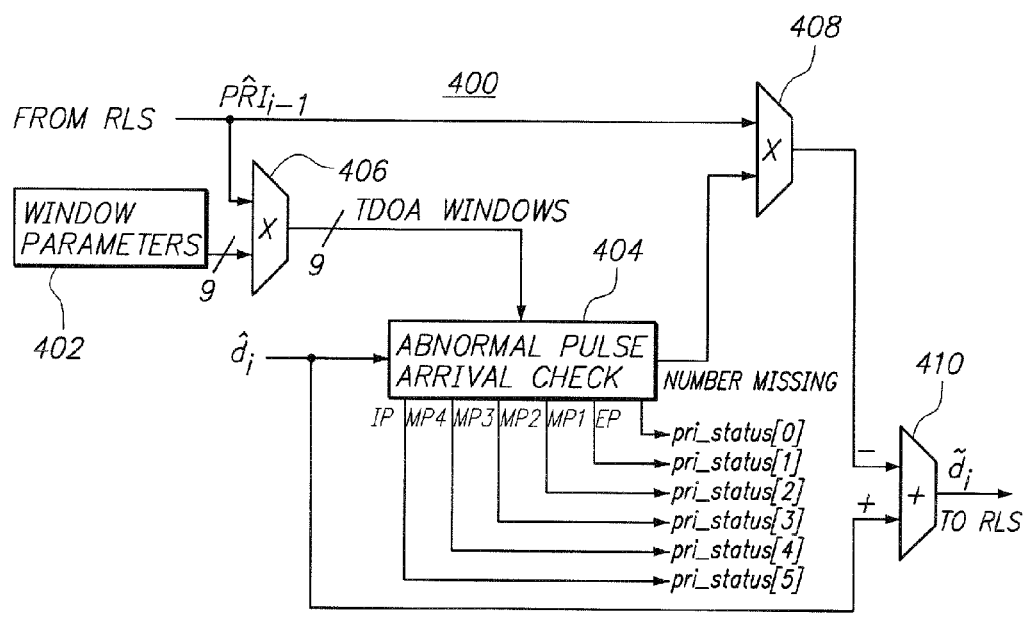
FIG. 4 shows an abnormal pulse filter, in accordance with an embodiment of the present invention.

One embodiment of the abnormal pulse filter 400 is shown in FIG. 4. The inputs to the example abnormal pulse filter 400 are the raw TDOA for the current pulse, ď, the last PRI estimate ($PRI_{i-1}$), and a set of window parameters (e.g., the δ's from table I). The output is the adjusted TDOA, ď, in this embodiment.

The window parameters (δ's) are input to multiplier 406, along with the last PRI estimate ($PRI_{i-1}$) to generate the TDOA windows 502. The abnormal pulse arrival check 404 inputs the TDOA windows 502 and raw TDOA ď for the current pulse and does a comparison to determine into which TDOA window 502 the current pulse falls. The abnormal pulse arrival check 404 stores a value in a status register to indicate whether the pulse was classified as early (EP), irregular (IP), or one or more pulses were missing (MP1, MP2, MP3, MP4). Other abnormal indicators could be stored, as well.

The abnormal pulse arrival check 404 outputs, to multiplier 408, a value that reflects the number of pulses that were missing, in this embodiment. This value is multiplied by the last PRI estimate to generate a TDOA adjustment. The TDOA adjustment is subtracted from the raw TDOA, ď, by adder 410 to arrive at the adjusted TDOA, ď.

The abnormal pulse analyzer 400 could also determine that one of more of the pulses should not be used in the estimation of a pulse parameter (such as PRI). For example, if a pulse is classified as early or irregular, this might indicate that the pulse was due to random noise. Thus, the abnormal pulse analyzer 400 might determine that this "false" pulse not be used to estimate the pulse parameter. In one embodiment, the abnormal pulse analyzer 400 determines that a TDOA should not be provided to the pulse parameter estimator 700 for such "false" pulses that are not candidates for estimating the pulse parameter.

Example Pulse Parameter Estimator

Figure 7:
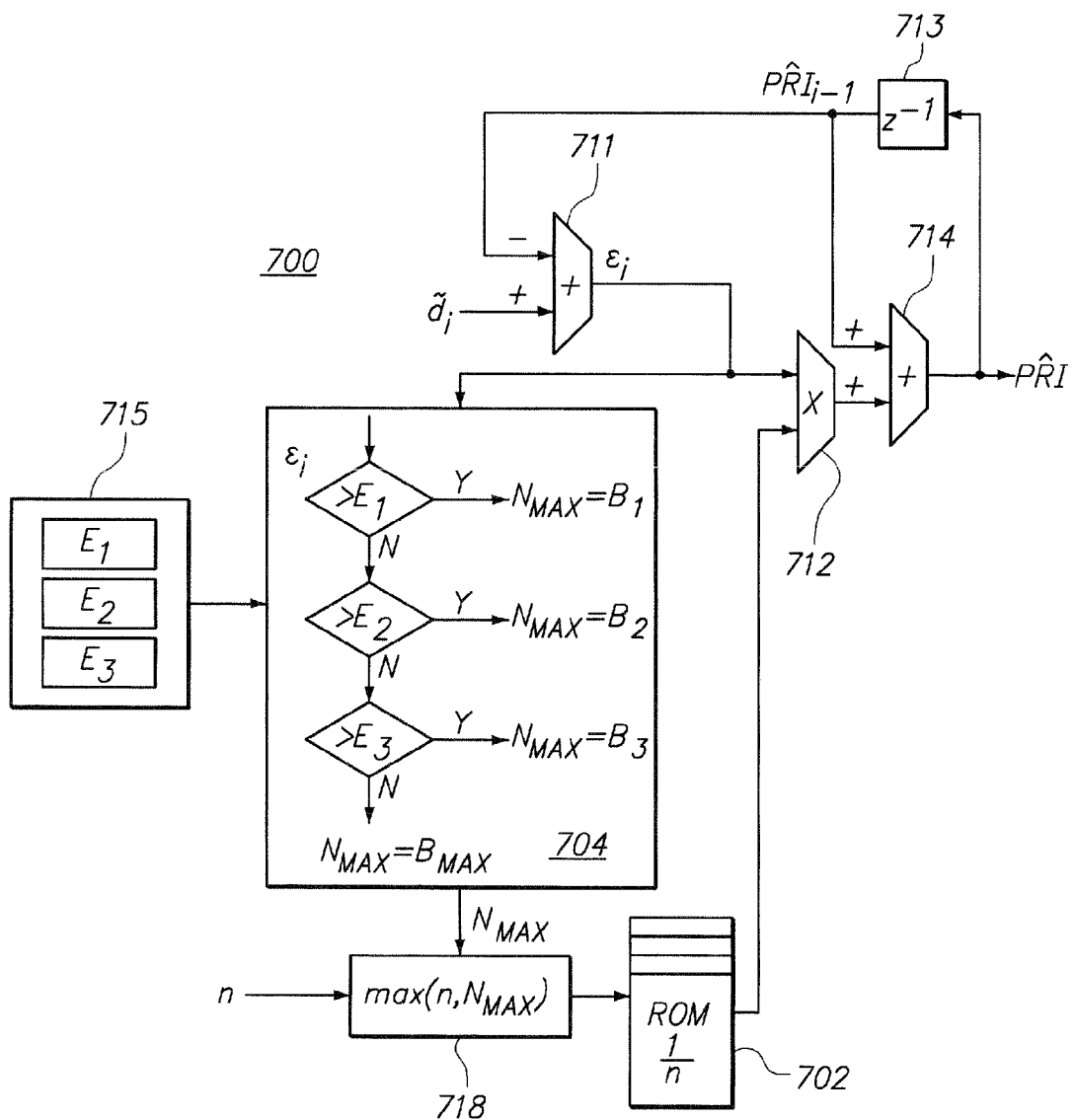
FIG. 7 shows a pulse repetition interval (PRI) estimator, in accordance with an embodiment of the present invention.

FIG. 7 shows a pulse parameter estimator 700, in accordance with an embodiment. This particular pulse parameter estimator 700 determines PRI; however, another pulse parameter could be estimated. The PRI estimator 700 uses the adjusted TDOA, ď, to determine a PRI based on the recursive least-squares (RLS) technique, in this embodiment. The basic RLS algorithm is given by equation 1:

$$\hat{PRI}_i = \hat{PRI}_{i-1} + \frac{1}{i}(\tilde{d}_i - \hat{PRI}_{i-1}) \quad [1]$$

In Equation 1, "i" denotes the current pulse index. The adjusted TDOA, ď is used in this example; however, the raw TDOA, $\hat{d}$ could be used instead. Furthermore, it is not required that the RLS technique be used to calculate PRI. Any kind of data smoother could be used, such as a least mean squares technique, a low-pass variable bandwidth filter, etc.

The adder 711, multiplier 712, adder 714, and delay 713 are used to implement Equation 7. In the embodiment shown in FIG. 7, the values for "i" in Equation 1 are provided from the ROM 702. Further, for pulse indices greater than the number of values in the ROM, "i" is clamped. At this point, the RLS algorithm becomes a fixed-length recursive block averager. Further details of this "block averager" will be discussed below.

Figure 8:
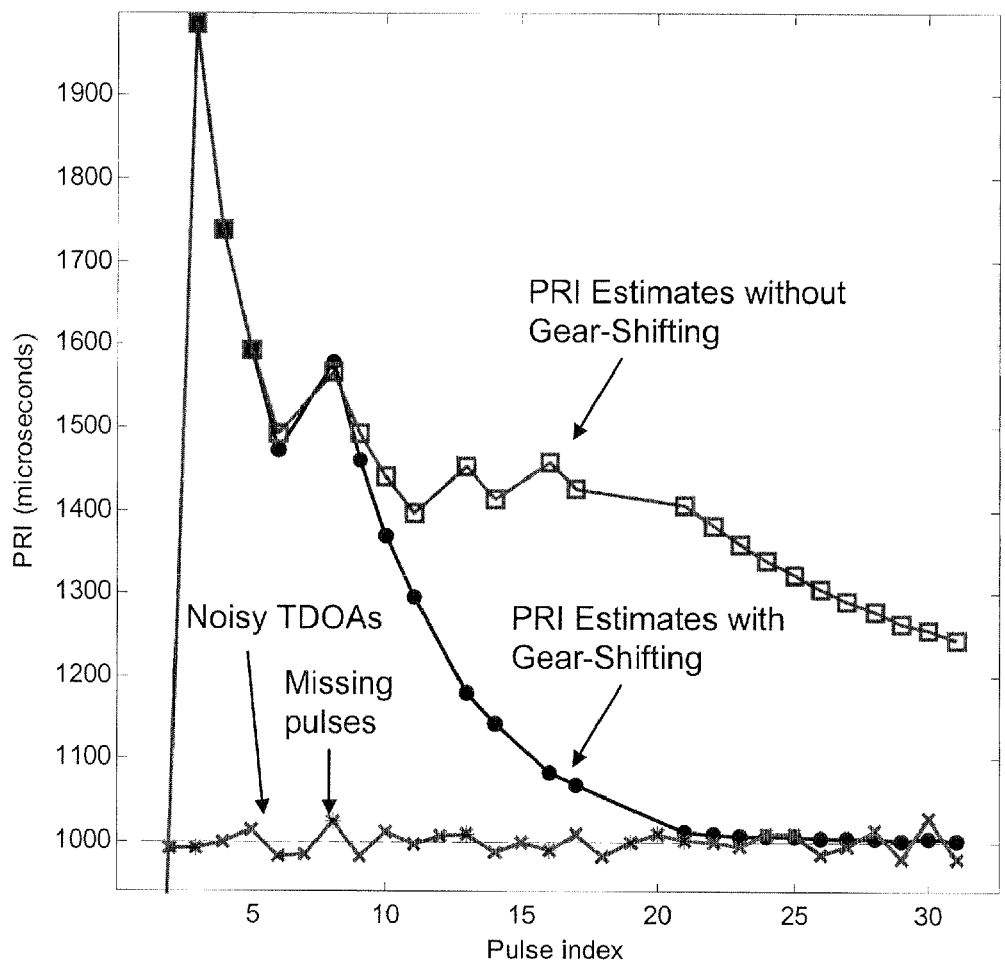
FIG. 8 shows a representative example of the estimator behavior with and without the gear-shifting.

The embodiment in FIG. 7 includes a "gear shifting" mechanism 704 for rapid convergence of PRI estimation. The gear shifting mechanism 704 restricts the amount of smoothing that is used, based on an error signal. The error signal, $\epsilon_i$, in the embodiment of FIG. 7, is defined as the difference between the adjusted TDOA estimate $\bar{d}$ (or the raw TDOA estimated if that is being used instead) and the last PRI estimate, $PRI_{i-1}$. If the error signal, $\epsilon_i$, is large, then the amount of smoothing is reduced. As the error signal becomes smaller, more smoothing is applied. A representative example of the estimator behavior with and without the gear-shifting is shown in FIG. 8.

The gear shifting mechanism 704 inputs the error signal, $\epsilon_i$, and accesses a set of registers 715 that store "gear" thresholds. The gear shifting mechanism 704 compares the error signal with the gear thresholds to determine what the "time interval" should be for determining the PRI. By the time interval it is meant how many pulses back the PRI calculation should go. For example, if the gear shifting mechanism 704 determines that the calculation should go back 7 pulses, then only data pertaining to the last 7 pulses are used to calculate PRI. In other words, referring to Equation 1, "i" is clamped such that the RLS algorithm operates as a block averager. Therefore, even if more than 7 pulses are available, the earlier pulses are not used in the determination of the PRI. The 7 pulses used in this example are not necessarily all of the detected pulses over that interval, as the abnormal pulse filter 400 may have removed some detected pulses as candidates for estimating the pulse parameter.

The gear shifting mechanism 704 selects a time interval that is inversely proportional to the magnitude of the error signal, in an embodiment. Referring to the example conditions tested for in FIG. 7, if the error signal is greater than the first threshold, then the time interval ($N_{MAX}$) is set to $B_1$, else if the error signal is greater than the second threshold, then the time interval ($N_{MAX}$) is set to $B_2$, else if the error signal is greater than the third threshold, then the time interval ($N_{MAX}$) is set to $B_3$, else if the error signal is greater than the fourth threshold, then the time interval ($N_{MAX}$) is set to $B_{Max}$. The thresholds are accessed from programmable registers, in an embodiment. There may be any number of thresholds. The time interval values ($B_1$-$B_{Max}$) are accessed from programmable registers, in an embodiment.

Note that the selected time interval ($N_{MAX}$) might be greater than the amount of data that exists. Therefore, the larger of time interval ($N_{MAX}$) and the number of pulses for which there is data (n) is computed by block 718. This value is used to select one or more appropriate values for "i" from the ROM 702. The values of "i" from the ROM 702 are input to multiplier 712, which computes the product of "i" times the error signal, $\epsilon_i$. Note again, that because the pulse parameter estimator 700 works as a block averager, in this embodiment, only the most recent data is used to compute the PRI.

Example Process Flows

The following processes can be implemented in hardware, software, or some combination of hardware and software. For example, theses processes could be implemented in an ASIC. However, at least some of the blocks in these processes could be implemented by executing instructions on a processor. These blocks in the following processes are discussed in a particular order as a matter of convenience to facilitate explanation. The processes are not limited to the order in which the blocks are discussed or depicted in the FIGs.

Figure 9A:
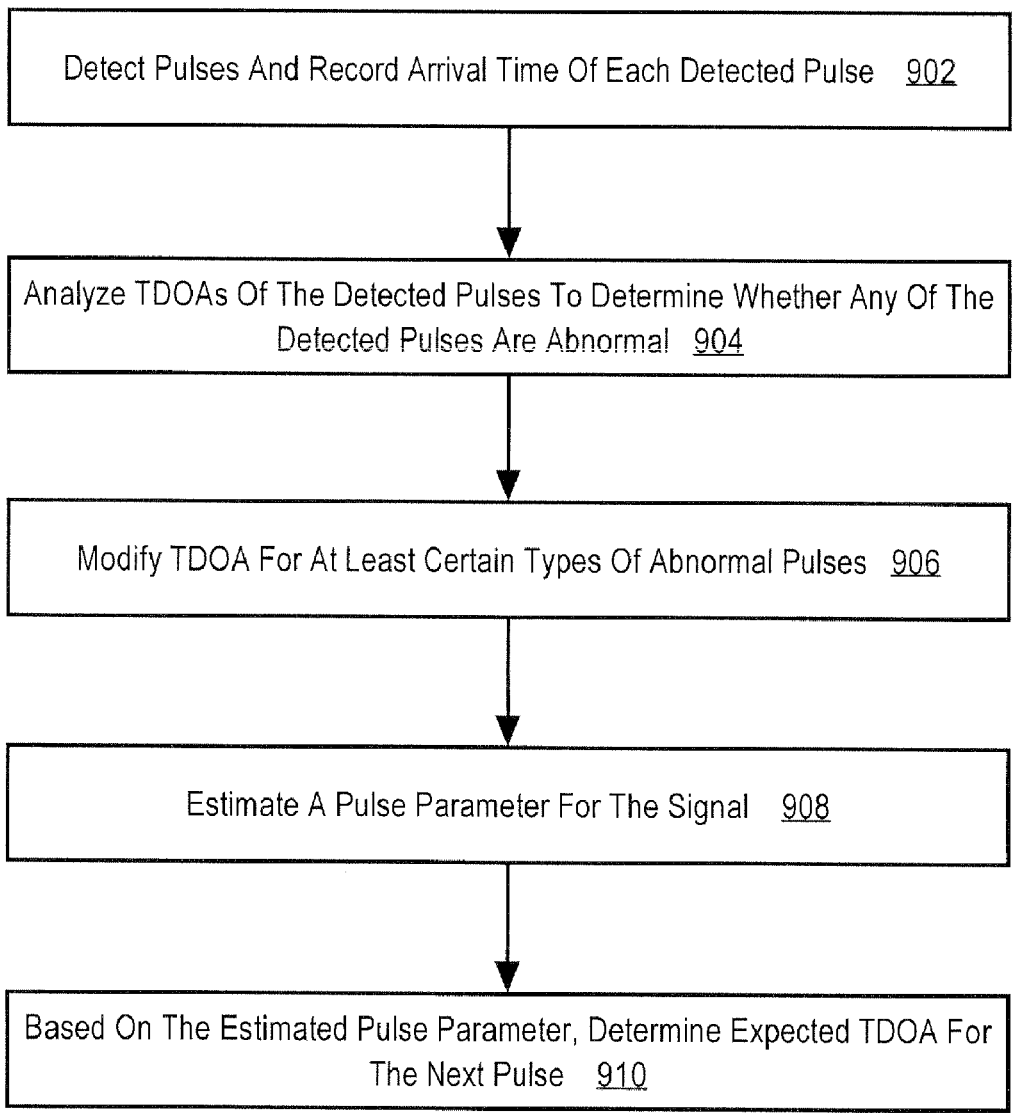
FIG. 9A is a flowchart of a process for extracting pulse parameters from a signal, in accordance with an embodiment.

FIG. 9A is a flowchart of a process 900 for extracting pulse parameters from a signal, in accordance with one embodiment. In block 902, pulses are detected and an arrival time of each detected pulse is recorded. A time difference of arrival (TDOA) for a given pulse is the difference between the arrival time for the given pulse and the last detected pulse.

In block 904, the TDOAs of the detected pulses are analyzed in order to determine whether any of the detected pulses are abnormal. An abnormal pulse is a pulse for which the TDOA is outside of a tolerance from an expected TDOA, in an embodiment. The tolerance is based on the GP window, in an embodiment.

In block 906, the TDOA is modified for at least certain types of abnormal pulses. For example, the certain types of abnormal pulses are those classified as being abnormal due to a determination that one or more previous pulses having not been detected.

In block 908, a pulse parameter is estimated for the signal based on an analysis of the TDOAs for a set of detected pulses that includes a current pulse. For this estimation, the modified TDOA from block 906 is used for the certain types of the abnormal pulses, in an embodiment. The set of detected pulses could be a portion of the detected pulses based on the time interval that is selected by a gear shifting mechanism 704, as described herein. The set of detected pulses also could be formed, at least in part, by not including certain abnormal pulses, such as early pulses or irregular pulses.

In block 910, based on the estimated pulse parameter, the expected TDOA is determined for the next pulse that is detected after the current pulse. This TDOA is then used in block 904 for the next iteration of process 900.

Figure 9B:
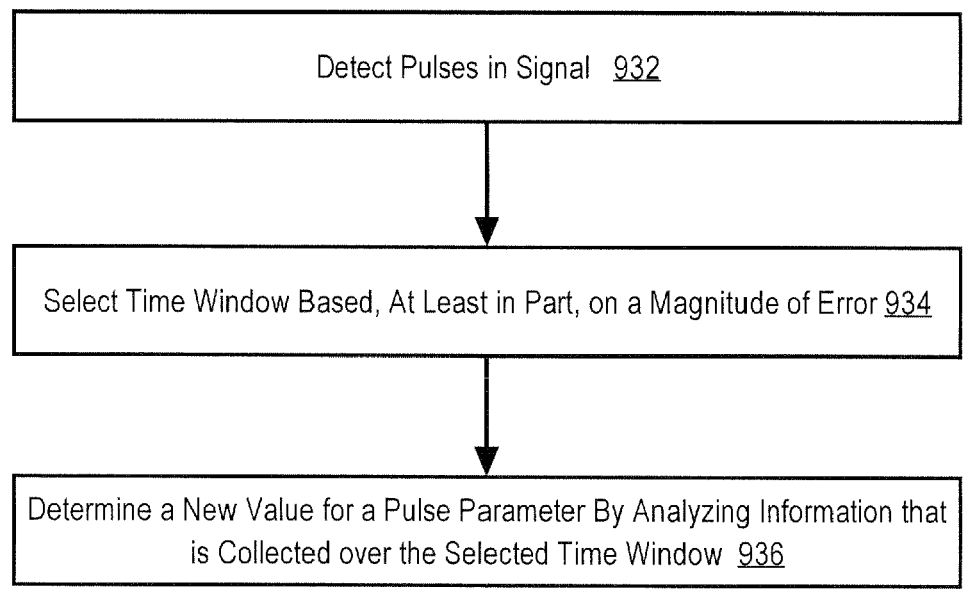
FIG. 9B is a flowchart of a process for extracting pulse parameters from a signal, in accordance with another embodiment.

FIG. 9B is a flowchart of a process 930 for extracting pulse parameters from a signal, in accordance with another embodiment. In block 932 pulses in the signal are detected. In block 934, a time window from a plurality of time windows is selected, based at least in part on a magnitude of an error. An example of a time window is the time interval that is selected by the gear shifting mechanism, as described herein. In one embodiment, the error is based on the difference between an adjusted TDOA of a current pulse and a previously estimated PRI. In block 936, a new value for a pulse parameter is determined by analyzing pulse information that is collected over the selected time window.

Figure 9C:
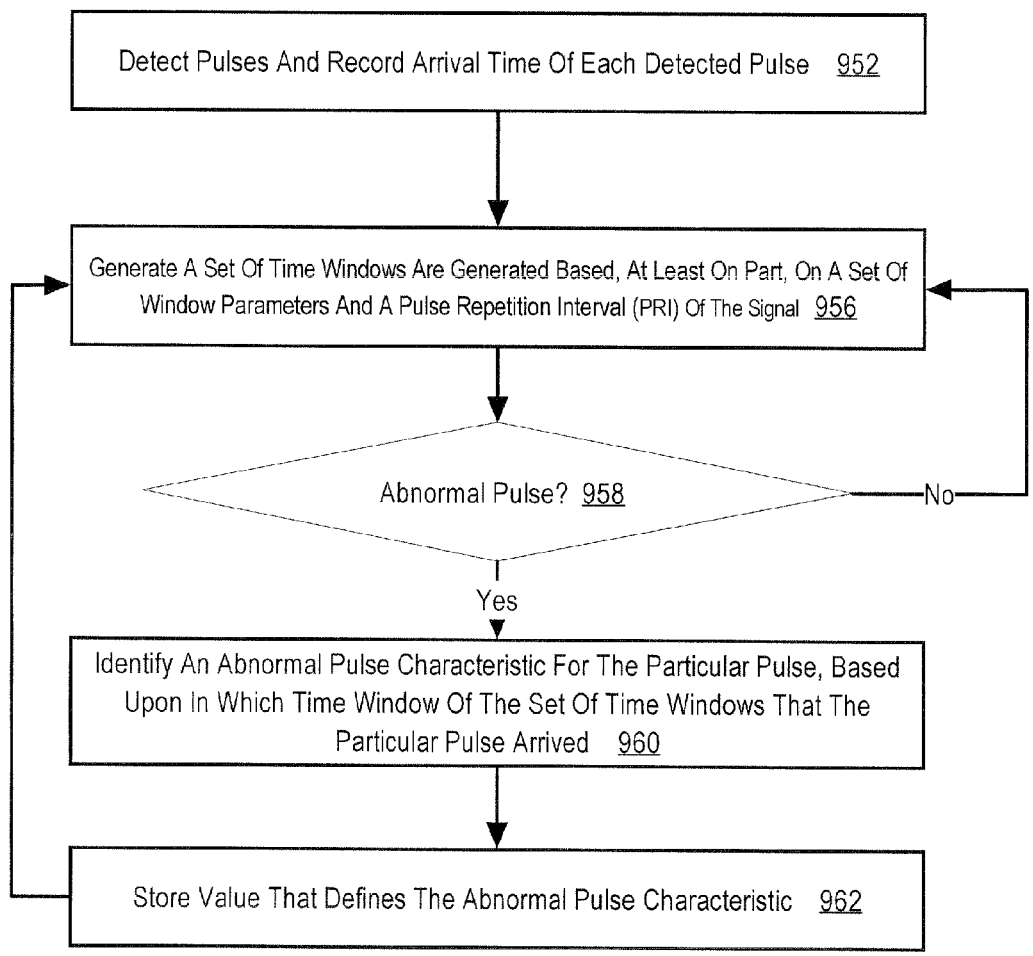
FIG. 9C is a flowchart of a process for detecting abnormal pulses in a signal, in accordance with another embodiment.

FIG. 9C is a flowchart of a process 950 for detecting abnormal pulses in a signal, in accordance with an embodiment. In block 952, pulses in the signal are detected and an arrival time of each detected pulse is recorded. In block 956, a set of time windows are generated based, at least on part, on a set of window parameters and a pulse repetition interval (PRI) of the signal. As an example, the TDOA windows are generated, as depicted in FIG. 4. Each window parameter has a value that is based on a pulse characteristic. An example of window parameter are the $\delta$'s from table I.

In block 958, a determination is made as to whether a particular pulse is an abnormal pulse, based on the set of time windows and a time difference of arrival (TDOA) of the particular pulse relative to the pulse detected prior to the particular pulse; and In response to determining that the particular pulse is abnormal, an abnormal pulse characteristic for the particular pulse is identified, based upon in which time window of the set of time windows that the particular pulse arrived, in step 960. Moreover, a value is stored that defines the abnormal pulse characteristic, in step 962.

Example Convergence Results

Referring again to the example convergence results of FIG. 8, a missing pulse on the second pulse index is not accounted for by the abnormal pulse filter 400 and therefore results in a large error in the PRI estimate. Without the gear-shifting, the RLS algorithm may take many samples to "forget" this poor estimate. The gear-shifting allows the RLS algorithm to converge much faster.

Figure 10A:
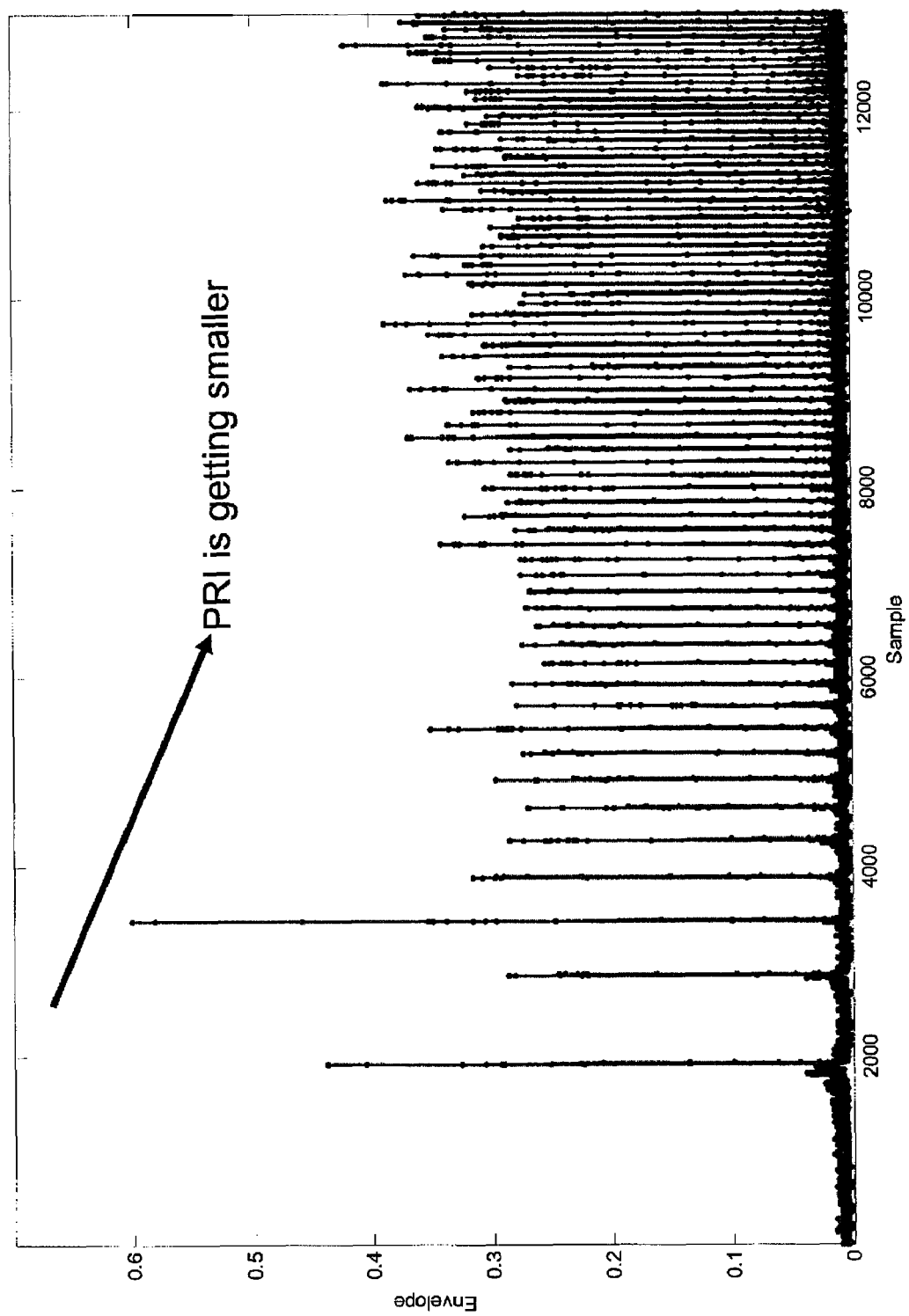
FIG. 10A illustrates an example signal for a microwave oven.
Figure 10B:
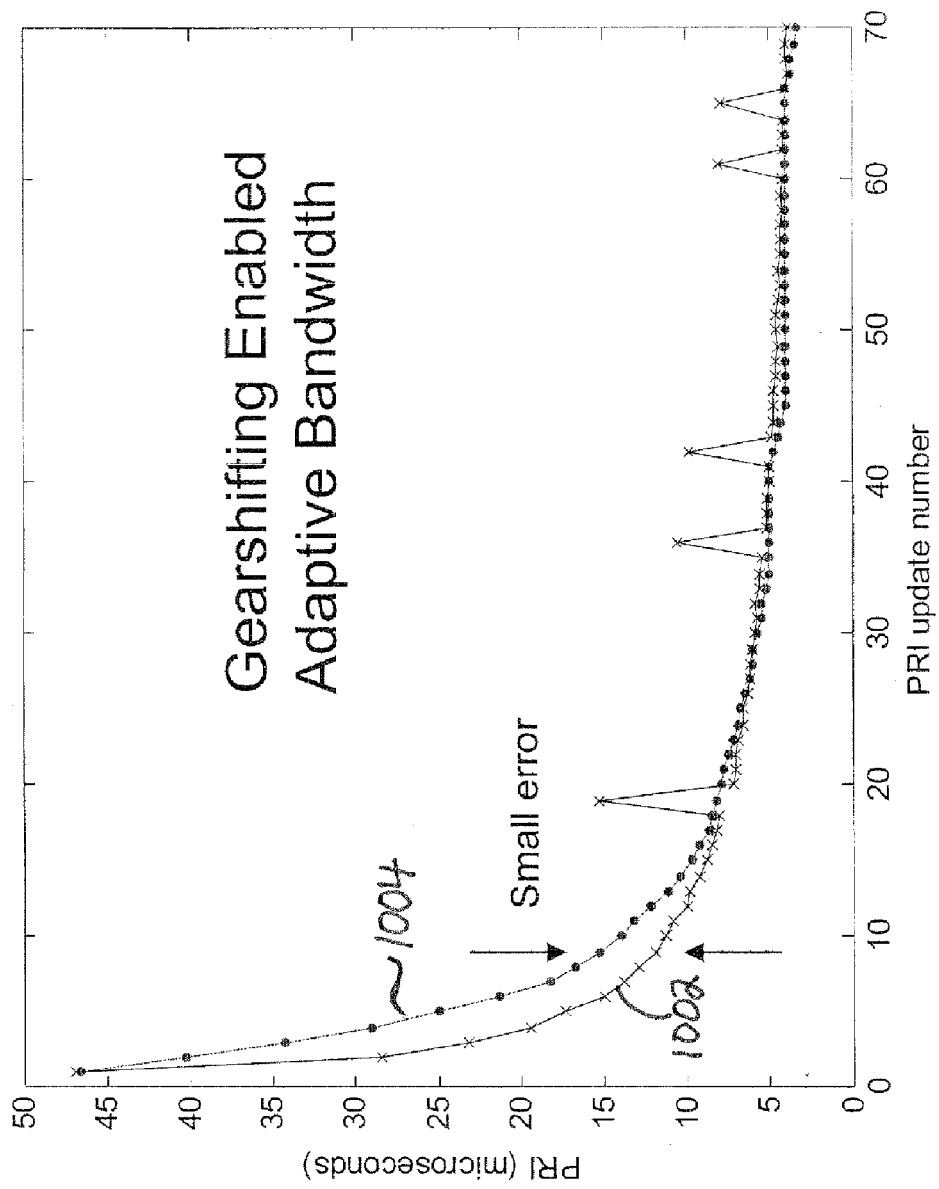
FIG. 10B is a graph that depicts a curve of the actual PRI of the example microwave oven signal of FIG. 10A and a curve of the PRI that is estimated by an embodiment of the present invention that uses gear shifting.
Figure 10C:
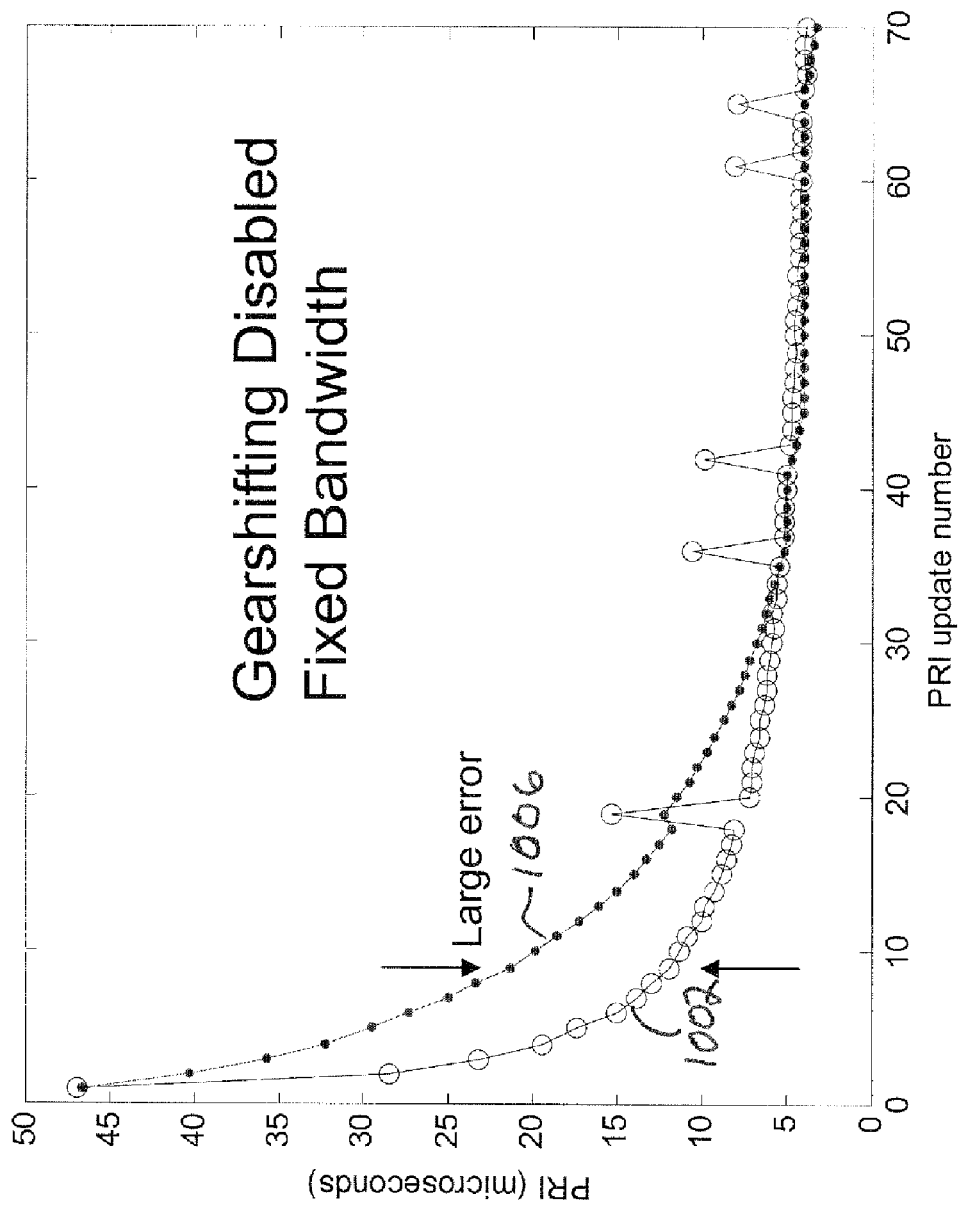
FIG. 10C is a graph that depicts a curve of the actual PRI of the example microwave oven signal of FIG. 10A and a curve of the PRI that is estimated with gear shifting disabled.

It is not required that the PRI be uniform. As an example, FIG. 10A illustrates a PRI of a signal from a microwave oven, wherein the PRI becomes smaller over time. FIG. 10B is a graph that depicts a curve 1002 of the actual PRI of the example microwave signal of FIG. 10A and a curve 1004 of the PRI that is estimated by an embodiment of the present invention that uses gear shifting as described herein. FIG. 10C is a graph that depicts a curve 1002 of the actual PRI of the example microwave signal of FIG. 10A and a curve 1006 of the PRI that is estimated with gear shifting disabled. Note that when gear shifting is used, as depicted in FIG. 10B, the PRI converges much more rapidly to the actual PRI than when gear shifting is disabled, as depicted in FIG. 10C. Also note that after about 10 pulses the error between the estimated PRI when using gear shifting is much smaller than the error with gear shifting disabled.

Note that while embodiments described herein do not explicitly account for the interleaving of pulsed signals from more than one source, the signals could be pre-sorted, for example, by pulse width, and process.

Implementation Mechanisms and Hardware Overview

The approach for pulse parameter estimation described herein may be implemented in a variety of ways and the invention is not limited to any particular implementation. The approach may be integrated into a wireless communications system or a wireless device, or may be implemented as a stand-alone mechanism. Furthermore, the approach may be implemented in computer software, hardware, or a combination thereof.

Hardware Overview

Figure 11:
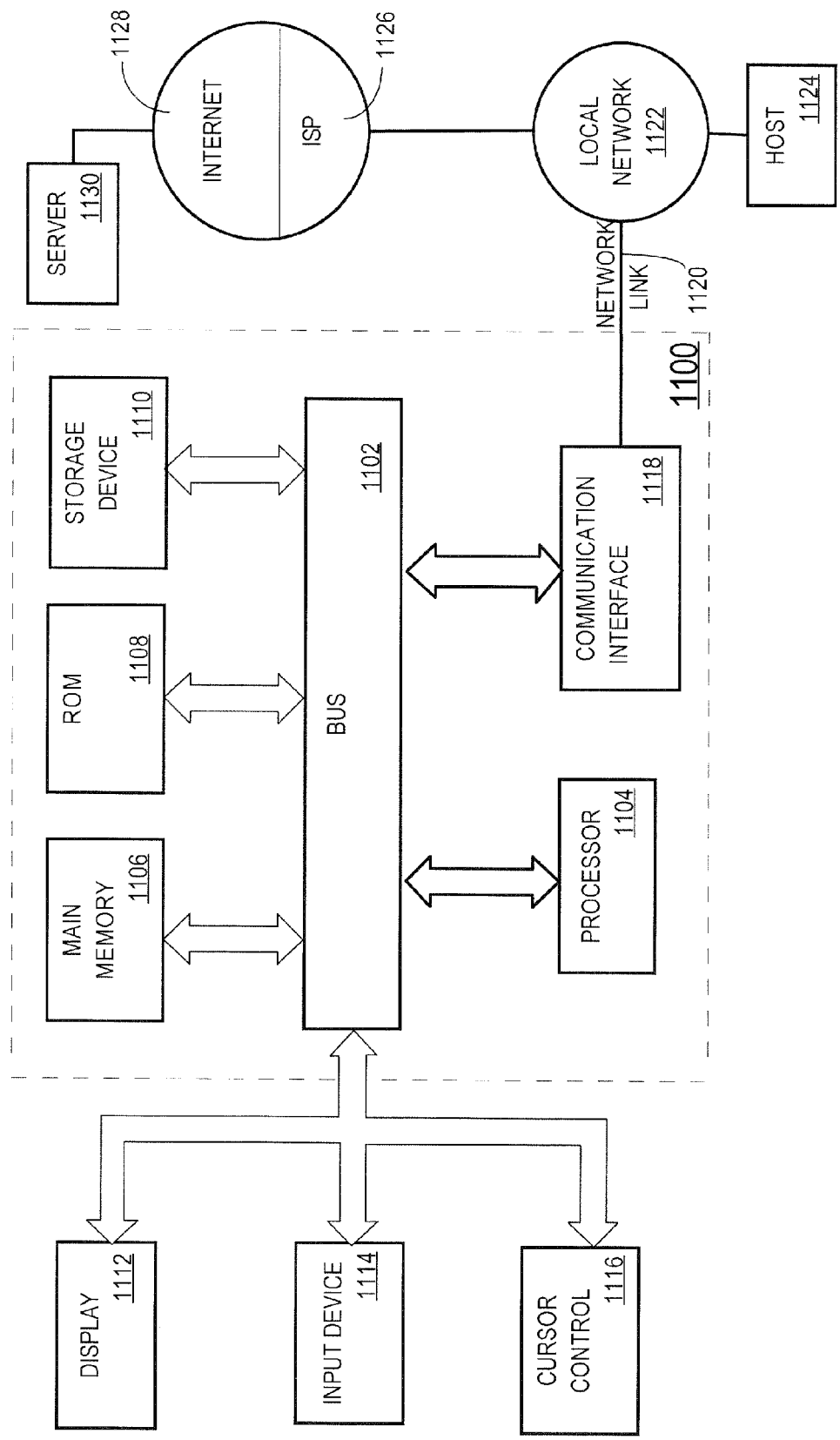
FIG. 11 is a block diagram that depicts a computer system upon which embodiments of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to storage media and transmission media. Storage media includes both non-volatile media and volatile media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for extracting pulse parameters from signals, said apparatus comprising:
    a pulse detection logic that is operable to detect pulses in a signal that is received by the apparatus;
    a pulse parameter estimation logic that is operable to:
    (a) select, based at least in part on a magnitude of an error, a time interval from a plurality of time intervals; and
    (b) determine a value for a pulse parameter by analyzing pulse information based on pulses that were detected over the selected time interval;
    wherein the error is based on a difference between pulse information derived, at least in part, from a particular detected pulse and a value of a pulse parameter estimated by the pulse parameter estimation logic by analyzing pulse information that is derived, at least in part, from pulses detected prior to the particular detected pulse but not the particular detected pulse,
    wherein one or more of the pulse detection logic and the pulse parameter estimation logic includes one or more hardware elements.

2. The apparatus of claim 1, wherein the information that is derived, at least in part, from the particular detected pulse is derived on a time difference of arrival (TDOA) between the particular detected pulse and a previous point in time.

3. The apparatus of claim 2, further comprising a logic that corrects the TDOA of the particular detected pulse based on a determination that one or more pulses of the signal were not detected by the apparatus.

4. The apparatus of claim 1, wherein the pulse parameter is a pulse repetition interval (PRI).

5. The apparatus of claim 1, wherein the pulse parameter estimation logic is further operable to select a time interval having a length that is inversely proportional to the magnitude of the error.

6. The apparatus of claim 1, wherein the pulse parameter estimation logic is operable to select the time interval by comparing a magnitude of the error with a set of thresholds.

7. An apparatus for detecting abnormal pulses in signals, the apparatus comprising:
    a pulse detection logic that is operable to detect pulses in a signal that is received by the apparatus and to record an arrival time of each detected pulse;
    a time window logic that is operable to:
    (a) hold a set of window parameters, wherein each window parameter has a value that is based on a pulse characteristic;
    (b) generate a set of time windows based, at least on part, on the set of window parameters and a pulse repetition interval (PRI) of the signal; and
    an abnormal pulse logic that is operable to:
    determine whether a particular pulse is an abnormal pulse, based on the set of time windows and a time difference of arrival (TDOA) of the particular pulse relative to the pulse detected prior to the particular pulse; and
    in response to determining that the particular pulse is abnormal:
        identify an abnormal pulse characteristic for the particular pulse, based upon which time window of the set of time windows that the particular pulse arrived; and
        store a value that defines the abnormal pulse characteristic,
    wherein one or more of the pulse detection logic, the time window logic, and the abnormal pulse logic includes one or more hardware elements.

8. The apparatus of claim 7, wherein the abnormal pulse characteristic is that one or more pulses are missing from the signal and the abnormal pulse logic is further operable to determine how many pulses are missing between the particular pulse and the pulse detected prior to the particular pulse.

9. The apparatus of claim 7, wherein the abnormal pulse logic is further operable to determine that the particular pulse was received earlier, by a specified tolerance, than an expected arrival time for the particular pulse, wherein the abnormal pulse characteristic is early arrival of the particular pulse.

10. The apparatus of claim 7, wherein the abnormal pulse logic is further operable to determine that the particular pulse was received within a specified tolerance of an expected arrival time for the particular pulse.

11. The apparatus of claim 7, further comprising a logic to estimate the PRI based on pulses detected prior to the particular pulse.

12. The apparatus of claim 7, wherein the TDOA for the particular pulse is a raw TDOA and further comprising TDOA correction logic that is operable to:
    determine an adjusted TDOA for the particular pulse based on the abnormal pulse characteristic for the particular pulse and the raw TDOA.

13. The apparatus of claim 12, wherein the TDOA correction logic is further operable to:
    determine the adjusted TDOA for the particular pulse based on a determination that one or more pulses of the signal were not detected by the apparatus.

14. An apparatus for extracting pulse parameters from a signal, the apparatus comprising:
    a pulse detection logic that is operable to detect pulses and to record an arrival time of each detected pulse, wherein a time difference of arrival (TDOA) for a given pulse is the difference between the arrival time for the given pulse and the last pulse detected before the given pulse;
    an abnormal pulse detection logic that is operable to:
        analyze the TDOAs of the detected pulses in order to determine whether any of the detected pulses are abnormal, wherein an abnormal pulse is a pulse for which the TDOA is outside of a tolerance from an expected TDOA; and
        modify the TDOA for at least certain types of abnormal pulses; and
    a pulse parameter logic that is operable to:
        estimate a pulse parameter for the signal based on an analysis of the TDOAs for a set of the detected pulses that includes a current pulse, wherein the modified TDOA is used for the certain types of the abnormal pulses; and
        based on the estimated pulse parameter, provide an abnormal pulse filter with a signal from which to derive the expected TDOA for the next pulse detected after the current pulse,
    wherein one or more of the pulse detection logic, the abnormal pulse detection logic, and the pulse parameter logic includes one or more hardware elements.

15. The apparatus of claim 14, wherein the abnormal pulse logic is further operable to determine how many pulses are missing between the current pulse and the last pulse detected prior to the current pulse, wherein the abnormal pulse filter is operable to modify the TDOA for the current pulse to account for the missing pulses.

16. The apparatus of claim 14, wherein the pulse parameter logic is further operable to determine the set of the detected pulses based, at least in part, on a magnitude of an error that is derived from a previously generated estimate for the pulse parameter and the TDOA for the current pulse.

17. The apparatus of claim 14, wherein the abnormal pulse logic is operable to:
    determine which detected pulses are candidates for estimating the pulse parameter, based on the determination of abnormal pulses; and
    identify the candidate pulses to the pulse parameter logic.

18. The apparatus of claim 14, wherein the estimated pulse logic is a pulse repetition interval (PRI).

19. The apparatus of claim 14, wherein the signal comprises an envelope and wherein the pulse detection logic is operable to detect the pulses and to record the arrival time of each detected pulse based on both the envelope of the signal and the derivative of the envelope of the signal.

20. The apparatus of 19, wherein the pulse detection logic is operable to determine the derivative using a finite-impulse-response (FIR) linear phase digital filter.

21. The apparatus of 19, wherein the pulse detection logic is operable to determine a positive edge and a negative edge of the signal envelope by threshold crossings and a first-order difference.

22. A method for extracting pulse parameters from a signal, said method comprising:
    detecting pulses and recording an arrival time of each detected pulse, wherein a time difference of arrival (TDOA) for a given pulse is the difference between the arrival time for the given pulse and the last detected pulse;
    analyzing the TDOAs of the detected pulses in order to determine whether any of the detected pulses are abnormal, wherein an abnormal pulse is a pulse for which the TDOA is outside of a tolerance from an expected TDOA;
    modifying the TDOA for at least certain types of abnormal pulses;
    estimating a pulse parameter for the signal based on an analysis of the TDOAs for a set of detected pulses that includes a current pulse, wherein the modified TDOA is used for the certain types of the abnormal pulses; and
    based on the estimated pulse parameter, deriving the expected TDOA for the next pulse that is detected after the current pulse,
    wherein the method is performed by one or more computing devices.

23. The method of claim 22, further comprising:
    selecting a time window from a plurality of time windows, based at least in part on a magnitude of an error, wherein the error is derived from a previously generated value for the pulse parameter and current pulse information.

24. The method of claim 23, wherein estimating the pulse parameter includes determining a new value for the pulse parameter by analyzing pulse information that is collected over the selected time window.

25. The method of claim 22, wherein the pulse parameter is a pulse repetition interval (PRI) and further comprising:
    generating a set of time windows based, at least in part, on a stored set of window parameters and the pulse repetition interval (PRI) of the signal, wherein each window parameter has a value that is based on a pulse characteristic; and wherein
    analyzing the TDOAs of the detected pulses in order to determine whether any of the detected pulses are abnormal is based on the set of time windows and a time difference of arrival (TDOA) of the current pulse relative to the last detected pulse.

26. The method of claim 22, further comprising:
    in response to determining that a pulse is abnormal:

identifying an abnormal pulse characteristic for the abnormal pulse, based upon which time window of the set of time windows that the abnormal pulse is associated with; and storing a value that defines the abnormal pulse characteristic.

27. A method for extracting pulse parameters from a signal, said method comprising:

detecting pulses in the signal;

selecting a time interval from a plurality of time intervals, based at least in part on a magnitude of an error; and determining a new value for a pulse parameter by analyzing pulse information that is collected over the selected time interval;

wherein the error is based on a difference between pulse information derived, at least in part, from a particular detected pulse and a value of the pulse parameter estimated by analyzing pulse information that is derived, at least in part, from pulses detected prior to the particular detected pulse but not the particular detected pulse, wherein the method is performed by one or more computing devices.

28. A method for detecting abnormal pulses in a signal, said method comprising:

detecting pulses in the signal;

recording an arrival time of each detected pulse;

generating a set of time windows based, at least in part, on a set of window parameters and a pulse repetition interval (PRI) of the signal, wherein each window parameter has a value that is based on a pulse characteristic;

determining whether a particular pulse is an abnormal pulse, based on the set of time windows and a time difference of arrival (TDOA) of the particular pulse relative to the pulse detected prior to the particular pulse; and in response to determining that the particular pulse is abnormal:

identifying an abnormal pulse characteristic for the particular pulse, based upon in which time window of the set of time windows that the particular pulse arrived; and storing a value that defines the abnormal pulse characteristic, wherein the method is performed by one or more computing devices.

29. A non-transitory machine-readable medium carrying one or more sequences of instructions for extracting pulse parameters from a signal, wherein execution of the one or more sequences of instructions by one or more processors causes the one or more processors to perform the steps of:

detecting pulses and recording an arrival time of each detected pulse, wherein a time difference of arrival (TDOA) for a given pulse is the difference between the arrival time for the given pulse and the last detected pulse;

analyzing the TDOAs of the detected pulses in order to determine whether any of the detected pulses are abnormal, wherein an abnormal pulse is a pulse for which the TDOA is outside of a tolerance from an expected TDOA;

modifying the TDOA for at least certain types of abnormal pulses;

estimating a pulse parameter for the signal based on an analysis of the TDOAs for a set of detected pulses that includes a current pulse, wherein the modified TDOA is used for the certain types of the abnormal pulses; and based on the estimated pulse parameter, deriving the expected TDOA for the next pulse that is detected after the current pulse.

30. A non-transitory machine-readable medium carrying one or more sequences of instructions for extracting pulse parameters from a signal, wherein execution of the one or more sequences of instructions by one or more processors causes the one or more processors to perform the steps of:

detecting pulses in the signal;

selecting a time interval from a plurality of time intervals, based at least in part on a magnitude of an error; and determining a new value for a pulse parameter by analyzing pulse information that is collected over the selected time interval;

wherein the error is based on a difference between pulse information derived, at least in part, from a particular detected pulse and a value of the pulse parameter estimated by analyzing pulse information that is derived, at least in part, from pulses detected prior to the particular detected pulse but not the particular detected pulse.

31. A non-transitory machine-readable medium carrying one or more sequences of instructions for detecting abnormal pulses in a signal, wherein execution of the one or more sequences of instructions by one or more processors causes the one or more processors to perform the steps of:

detecting pulses in the signal;

recording an arrival time of each detected pulse;

generating a set of time windows based, at least in part, on a set of window parameters and a pulse repetition interval (PRI) of the signal, wherein each window parameter has a value that is based on a pulse characteristic;

determining whether a particular pulse is an abnormal pulse, based on the set of time windows and a time difference of arrival (TDOA) of the particular pulse relative to the pulse detected prior to the particular pulse; and in response to determining that the particular pulse is abnormal:

identifying an abnormal pulse characteristic for the particular pulse, based upon in which time window of the set of time windows that the particular pulse arrived; and storing a value that defines the abnormal pulse characteristic.

* * * * *